United States Patent [19]
Sasaki et al.

[11] Patent Number: 5,260,931
[45] Date of Patent: Nov. 9, 1993

[54] DISK CARTRIDGE WITH IMPROVED TRANSMISSION SHUTTER MECHANISM

[75] Inventors: Morimasa Sasaki, Saku; Haruo Shiba, Komoro; Masaru Ikebe, Saku, all of Japan

[73] Assignee: TDK Corporation, Tokyo, Japan

[21] Appl. No.: 770,093

[22] Filed: Oct. 1, 1991

[30] Foreign Application Priority Data

Oct. 2, 1990 [JP] Japan .............................. 2-103346[U]

[51] Int. Cl.$^5$ .............................................. G11B 3/70
[52] U.S. Cl. ..................................... 369/291; 360/133
[58] Field of Search ............... 369/291, 77.2; 360/133; 206/444

[56] References Cited

U.S. PATENT DOCUMENTS

| | | | |
|---|---|---|---|
| 4,682,322 | 7/1987 | Ohta | 369/291 |
| 4,807,079 | 2/1989 | Takahashi | 360/133 |
| 5,111,350 | 5/1992 | Carey et al. | 369/291 |
| 5,153,801 | 10/1992 | Ikebe et al. | 360/133 |

FOREIGN PATENT DOCUMENTS 61-145382 9/1986 Japan .
61-189472 11/1986 Japan .

Primary Examiner—David C. Nelms
Assistant Examiner—K. Shami
Attorney, Agent, or Firm—Price, Gess & Ubell

[57] ABSTRACT

A disk cartridge has a disk accommodated in a casing having a center aperture and access windows. A pivotal shutter is pivotally mounted for closing the center aperture. A rotary shutter is rotatably mounted for closing the access windows and interlocked with the pivotal shutter. A first slidable member is cooperatively coupled to the rotary shutter, and a second slidable member is opposed to the first slidable member and adapted to be slid upon engagement with a shutter actuating member when a disk drive is loaded with the disk cartridge. The first and second slidable members having racks on their opposed surfaces interlocked through a gear mechanism for transmitting the motion of the second slidable member to the first slidable member, which in turn, drives the rotary shutter.

12 Claims, 5 Drawing Sheets

DISK CARTRIDGE WITH IMPROVED TRANSMISSION SHUTTER MECHANISM

CROSS-REFERENCE TO THE RELATED APPLICATION

Reference is made to Ikebe, Sasaki, Shiba and Hashizume, copending application Ser. No. 705,022 filed May 22, 1991, for "Disk Cartridge" now U.S. Pat. No. 5,153,801.

This invention relates to a disk cartridge having a hard disk, especially an optical disk accommodated in a casing.

BACKGROUND OF THE INVENTION

Compact disks (CD) and video disks (LD) as information recording media are often available in the form of disk cartridges having the disks accommodated in casings whereupon recording/reproducing machines such as disk players are loaded with the cartridges. The disk players have a drive shaft for driving the disk and a pickup for recording and reproducing bits of information into and from the disk.

To protect these disks against deposition of dust and debris, damages during handling, and temperature influence, the disks are conventionally enclosed in casings. Each casing includes a center aperture located generally at the center of the casing for allowing the drive shaft to extend therethrough to engage the disk annular hub for driving and an access window located radially outward of the center aperture for allowing a pickup to make access to the disk therethrough for recording and reproducing when the disk player is loaded with the cartridge. The casing further includes movable shutters for normally closing the windows when the disk is not used.

For recording or reproducing numerous data for an instant in an optical disk or the like, a plurality of pickups are required and the casing must then be provided with a plurality of access windows through which the pickups can make access to the disk. The shutters are thus required to simultaneously open or close the center and access windows during loaded and unloaded periods of the disk for the purpose of protecting the disk against dust and debris. Various types of shutters have been proposed for simultaneously opening and closing these windows. A simple one is a unidirectional slide shutter, which would result in a disk cartridge of increased size as a whole. A combination shutter including a shutter member for a center aperture and a rotary shutter member having a large diameter is useful. In order for a single slide to actuate both the shutter members, the slide must be moved over a large stroke and thus needs a relatively large size of mechanism for driving the slide as opposed to the general requirement for a smaller size of actuation mechanism. An additional problem arises with a spring for biasing the slide in closing or opening direction. As the stroke of the slide increases, the difference in spring force between the open and closed states becomes larger. In either of the states excess loads can be applied to the related members, which would experience distortion during storage particularly at elevated temperatures. In some cases, a great force is required for the actuation mechanism to open the shutter.

SUMMARY OF THE INVENTION

An object of the present invention is to provide a compact safe disk cartridge having center and access windows and shutter means therefor requiring only a reduced stroke of a slide thereof and ensuring smooth shutter operation.

In one form of the present invention, a disk cartridge which is to be loaded in a disk drive having a drive shaft and a shutter actuating member is provided comprising a generally rectangular casing accommodating a disk for rotation therein and including a center aperture for inserting the drive shaft and a plurality of access windows in at least one of its major walls. Shutter means is disposed between the casing wall and the disk for opening and closing the center aperture and the access windows. Preferably, the shutter means includes, in an interlocking relationship, a rotary shutter member mounted coaxially about the center aperture for rotation and having a plurality of openings at positions corresponding to the plurality of access windows, and a pivotal shutter member mounted at a position spaced from the center aperture for pivotal motion for opening and closing the center aperture. A mechanism for operating the shutter means includes a first slide member slidably disposed in the casing and cooperatively coupled to the shutter means, and a second slide member slidably disposed along one side of the casing in parallel to the first slide member. The second slide member is adapted to be slid upon engagement with the shutter actuating member when the disk drive is loaded with the disk cartridge. The first and second slide members have racks on their opposed surfaces, and a gear mechanism is in mesh with the racks on the first and second slide members for transmitting the motion of the second slide member to the first slide member.

DESCRIPTION OF THE PREFERRED EMBODIMENTS

Figure 1:
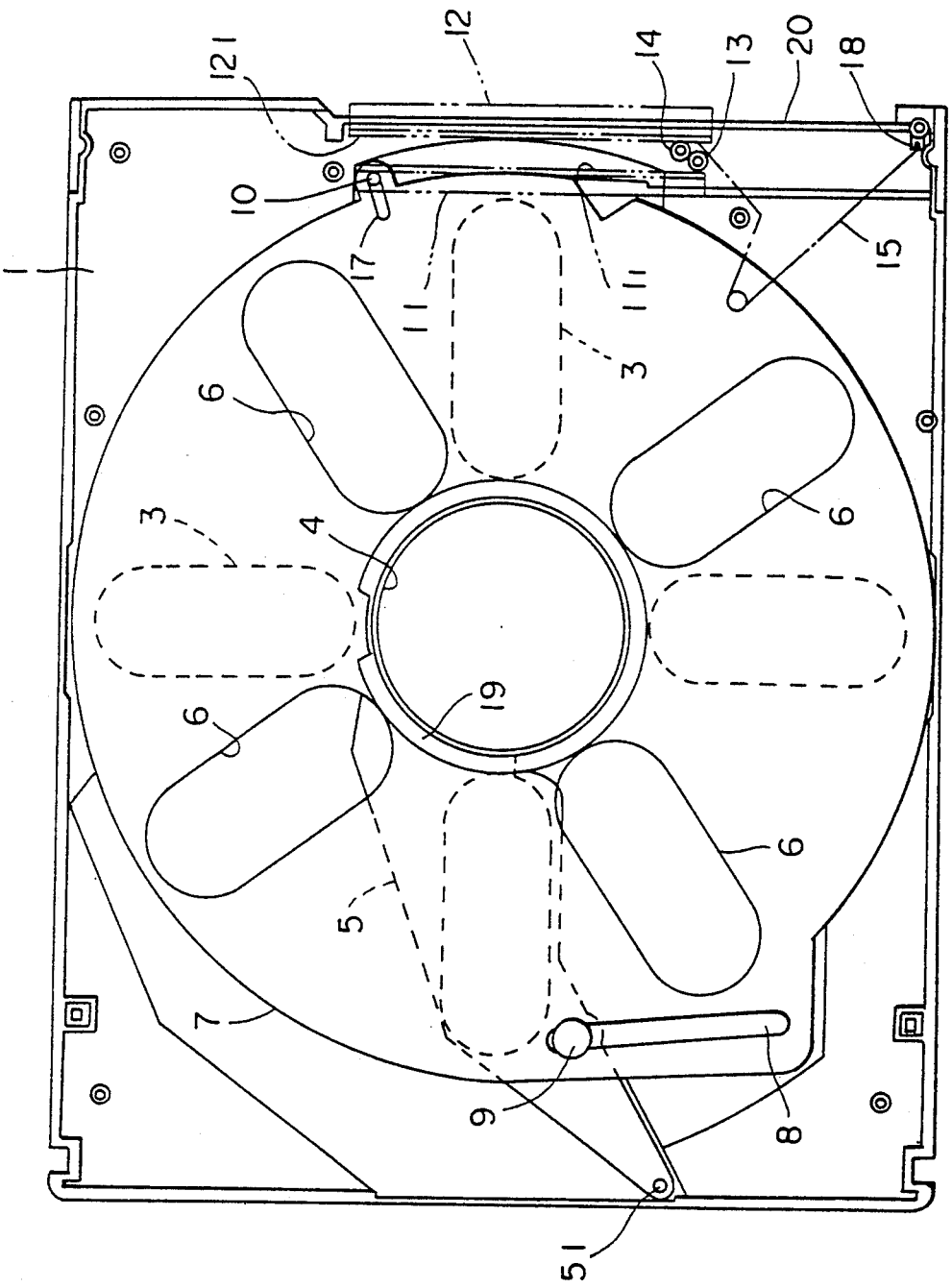
FIG. 1 is a plane view of a disk cartridge according to one embodiment of the invention showing a casing lower half in an out-of-service condition.

Referring to FIGS. 1 to 4, there is illustrated a disk cartridge comprising a generally rectangular casing consisting of a pair of upper and lower halves. The casing accommodates a disk (not shown) for rotation about a center therein. The disk cartridge is adapted to be loaded in a disk drive having a drive shaft, a plurality of pickups, and a shutter actuating member although these disk drive members are not shown in the figures. In the plan views of FIGS. 1 and 2, only the casing lower half designated at 1, particularly its inside surface is shown with the casing upper half removed. If the disk is double sided, the casing upper half is substantially the same as the lower half.

The casing (lower half) 1 includes a circular center aperture 4 disposed generally at the center of the casing coincide with the the disk center for allowing the drive shaft to extend therethrough to engage the disk center hub for driving. The casing 1 also includes a plurality of, four in the illustrated embodiment, access windows 3 disposed radially outward of the center aperture 4 for allowing the pickups to make access to the disk for recording and reproducing. Preferably the access windows 3 are equiangularly distributed about the casing center and track-shaped with their major axis in radial alignment with the casing center.

Shutter means is provided for opening and closing the center aperture and the access windows. The shutter means includes a rotary shutter member 7 mounted coaxially about the center aperture 4 for rotation and having a plurality of openings 6 at positions corresponding to the plurality of access windows 3, and a pivotal shutter member 5 mounted at a position 51 spaced from the center aperture 4 for pivotal motion for opening and closing the center aperture 4. More particularly, the rotary shutter member 7 is an annular member having a radially inner edge rotatably mounted about a central annular rim 19 of the casing defining the center aperture 4. The annular shutter member 7 is provided with four openings 6 which are equiangularly spaced and track-shaped as are the access windows 3. The pivotal shutter member 5 is a configured arm having one end mounted for pivotal motion to the casing 1 by a pin 51 which is spaced from the center aperture 4 and located outside the confine of the annular shutter member 7, e.g., near the left side of the casing 1 in the illustrated embodiment. The arm 5 has a free distal portion which is circular having approximately the same diameter as the center aperture 4. The rotary and pivotal shutter members 7 and 5 are partially overlapped as viewed in an axial direction. The rotary shutter member 7 overlies the pivotal shutter member 5 on the casing lower half 1 in the illustrated embodiment. Also included is means for interlocking the rotary and pivotal shutter members 7 and 5. The rotary shutter member 7 is provided with a guide slot 8. A pin 9 is fixedly joined to the pivotal shutter member 5 and received in the guide slot 8 for linear motion. This interlocking means is exemplary and the guide slot and pin may be provided inversely. Any desired interlocking mechanisms may be used insofar as the rotary and pivotal shutter members 7 and 5 are brought into the closed or open positions at the same time.

Also provided is means for selectively actuating the shutter means. A first slide member 11 is slidably disposed in the casing (lower half) 1 and cooperatively engaged with the rotary shutter member 7. A second slide member 12 is slidably fitted on the right edge 20 of the casing (lower half) 1 in parallel to the first slide member 11. More particularly, the first slide member 11 is received in a guide slot 16 extending in the casing lower half in parallel to the adjacent edge thereof for linear sliding motion. The second slide member 12 is adapted to be slid upon engagement with the shutter actuating member (not shown) when the disk drive is loaded with the disk cartridge. The first and second slide members 11 and 12 have racks 111 and 121 on their opposed surfaces. A gear mechanism includes gears 13 and 14 in mesh with the first and second slide member racks 111 and 121 for transmitting the motion of the second slide member 12 to the first slide member 11.

Figure 5:
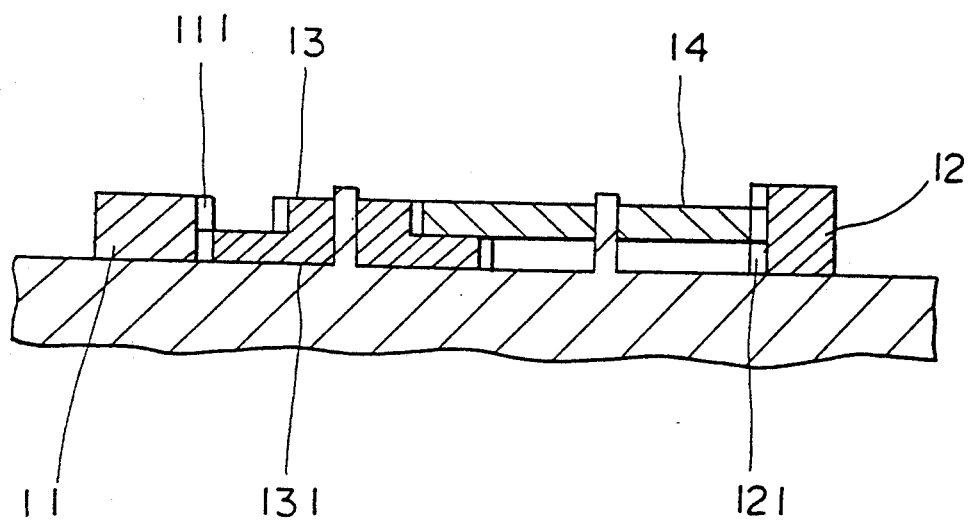
FIG. 5 is an enlarged cross section of the slide members and gears according to another embodiment of the invention.

Preferably, the gear mechanism is designed such that the transmitted motion of the first slide member 11 is greater than the motion of the second slide member 12. As shown in FIG. 5, such stroke amplifying gear mechanism includes a small gear 13, a large gear 14, and a large gear 131 coaxial with the small gear 13, the gears being rotatable about stationary pins standing on the casing. The large gear 131 is in mesh with the first slide member rack 111 and the larger gear 14 is in mesh with the small gear 13 and the second slide member rack 121. The gear ratio of these gears is selected such that the motion transmitted from the second member 12 to the first member 11 is amplified. While the second slide member 12 on the drive side is moved a small stroke, the first slide member 11 on the shutter side is moved a larger stroke, ensuring smooth and light operation of opening and closing the shutter members and reducing the difference in spring force between the open and closed states of the shutter members.

The second slide member 12 is disposed along the right edge (as viewed in FIGS. 1 and 2) of the casing for sliding motion and biased in closing direction by a connecting member in the form of a spring 15. The spring 15 has one end fixedly secured to a seat 18 formed at one corner of the casing and another end in engagement with one end of the second slide member 12. Therefore, the second slide member 12 is normally spring biased upward as shown in FIG. 1.

As described above, the first slide member 11 is received in the guide slot 16 for sliding motion. The first member 11 has a pin 10 projecting therefrom and received in a slot 17 in the rotary shutter member 7. This pin-slot engagement enables cooperative motion between the first slide member 11 and the rotary shutter member 7.

Figure 2:
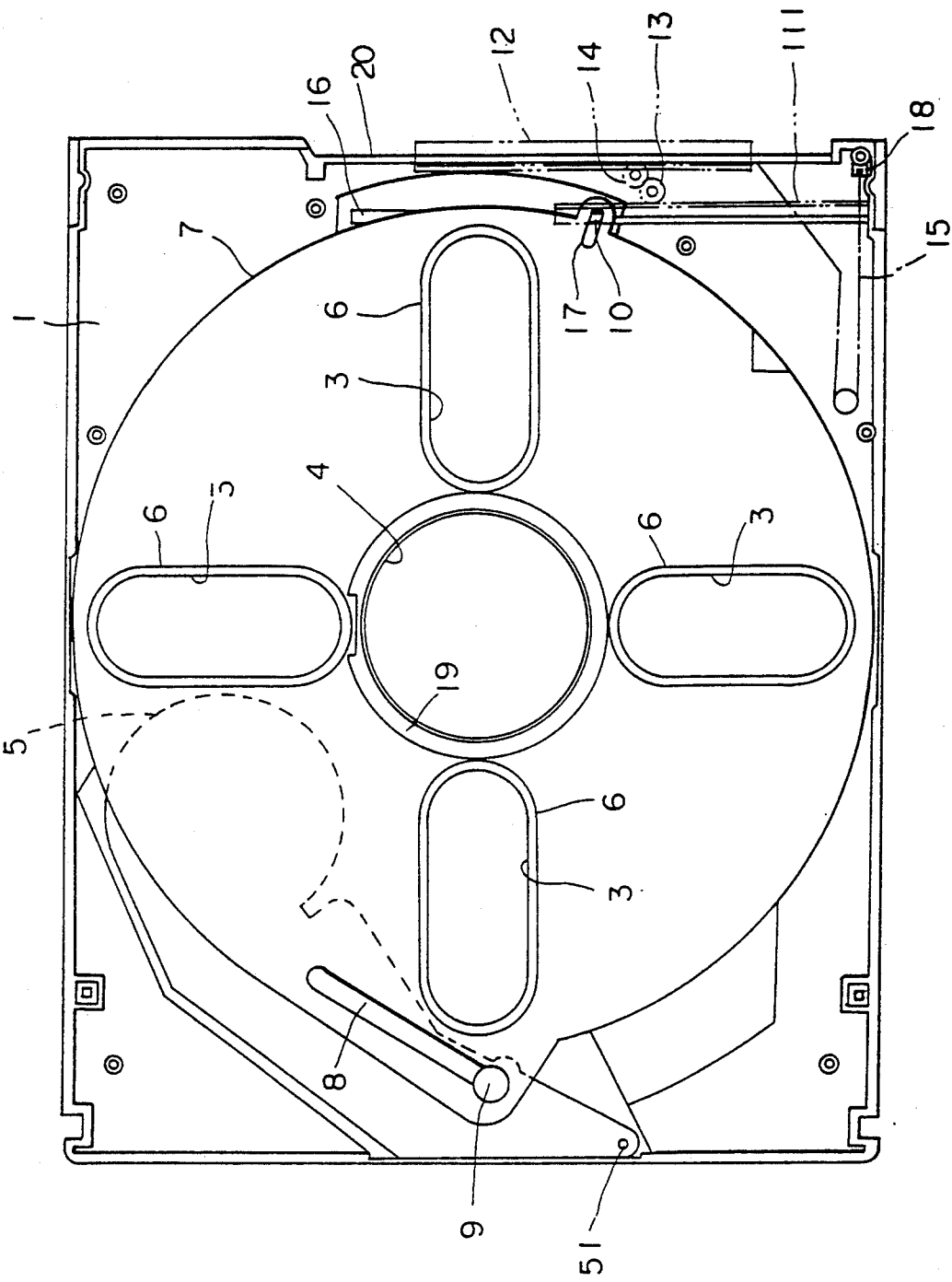
FIG. 2 is a plane view of the cartridge casing lower half in an operating condition.

In a preferred embodiment, the pivotal shutter member 5 is configured such that it is cleared off from any access windows 3 in its retracted position (FIG. 2). If desired, the pivotal shutter member 5 may be provided with an opening for opening one of the access windows 3 when aligned. The pivotal and rotary shutter members 5 and 7 are interlocked through the pin-slot engagement 8, 9 as previously described. Broadly stated, one shutter member is provided with a projection and the other shutter member is provided with a recess or opening and they are interlocked through the projection-recess engagement. It is also possible to directly engage the shutter members 5 and 7 for interlocking or to interpose an additional slide between the shutter members 5 and 7. Understandably, the interlocking means is not limited to the illustrated and exemplified ones.

Though not shown, the pivotal shutter member 5 may be provided with a spring for normally imparting recovery force to the member 5 toward the closing position. That is, the pivotal shutter member 5 is biased in the closing direction.

It is seen in FIGS. 1 and 2 that the central rim 19 is provided with a narrow annular flange for restricting the axial position or height of the shutter member 7 (and hence the shutter member 5) for preventing its runout.

The following description explains how the disk cartridge operates.

Normally, the disk cartridge assumes the position shown in FIG. 1 wherein the rotary shutter member 7 is biased such that the openings 6 are offset from the access windows 3, that is, the access windows 3 are closed with the shutter member 7, and the pivotal shutter member 5 is biased to close the center aperture 4.

Figure 3:
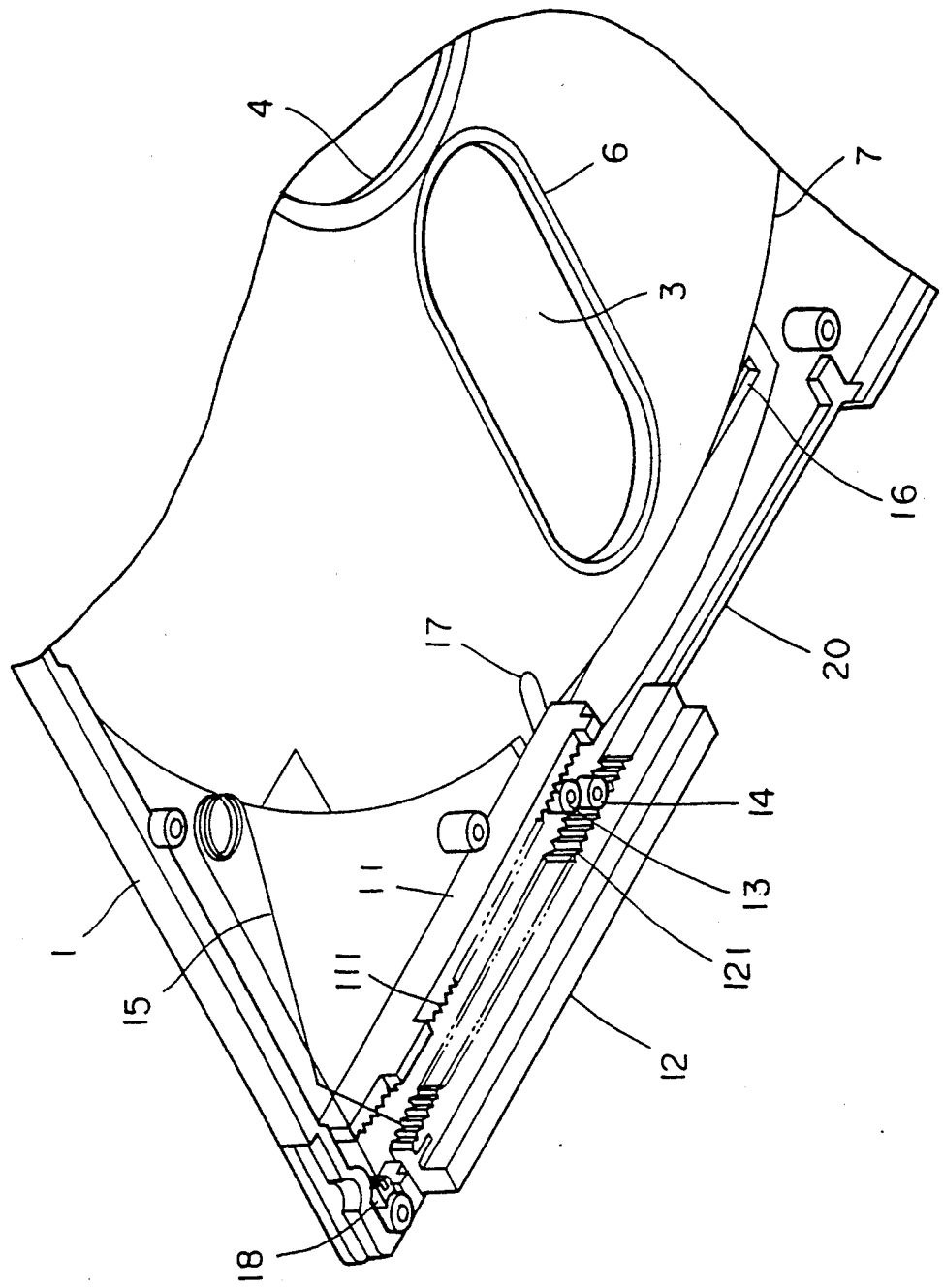
FIGS. 3 and 4 are fragmentary perspective views of the slide interlocking mechanism of the cartridge in operating and normal conditions, respectively.

Now, the disk player is loaded with the disk cartridge whereupon the shutter actuating member (not shown) comes in contact with the second slide member 12 to urge the member 12 downward against the spring 15 from the position of FIG. 1 to the position of FIG. 2. The sliding motion of the second member 12 is transmitted to the first slide member 11 through the gear mechanism 13, 14, preferably an amplified motion being imparted to the first member 11. Through the interlocking mechanism 10, 17, the downward sliding motion of the first member 11 from FIG. 1 to FIG. 2 causes the rotary shutter member 7 to rotate clockwise from FIG. 1 to FIG. 2 about the center aperture 4 until the openings 6 are aligned with the access windows 3 as shown in FIG. 2, thus opening the access windows 3. Cooperatively, the pivotal shutter member 5 is rotated counterclockwise from FIG. 1 to FIG. 2 through the interlocking mechanism 8, 9, leaving the center aperture 4 open. The position where both the access windows 3 and center aperture 4 are open is shown in FIGS. 2 and 3.

Figure 4:
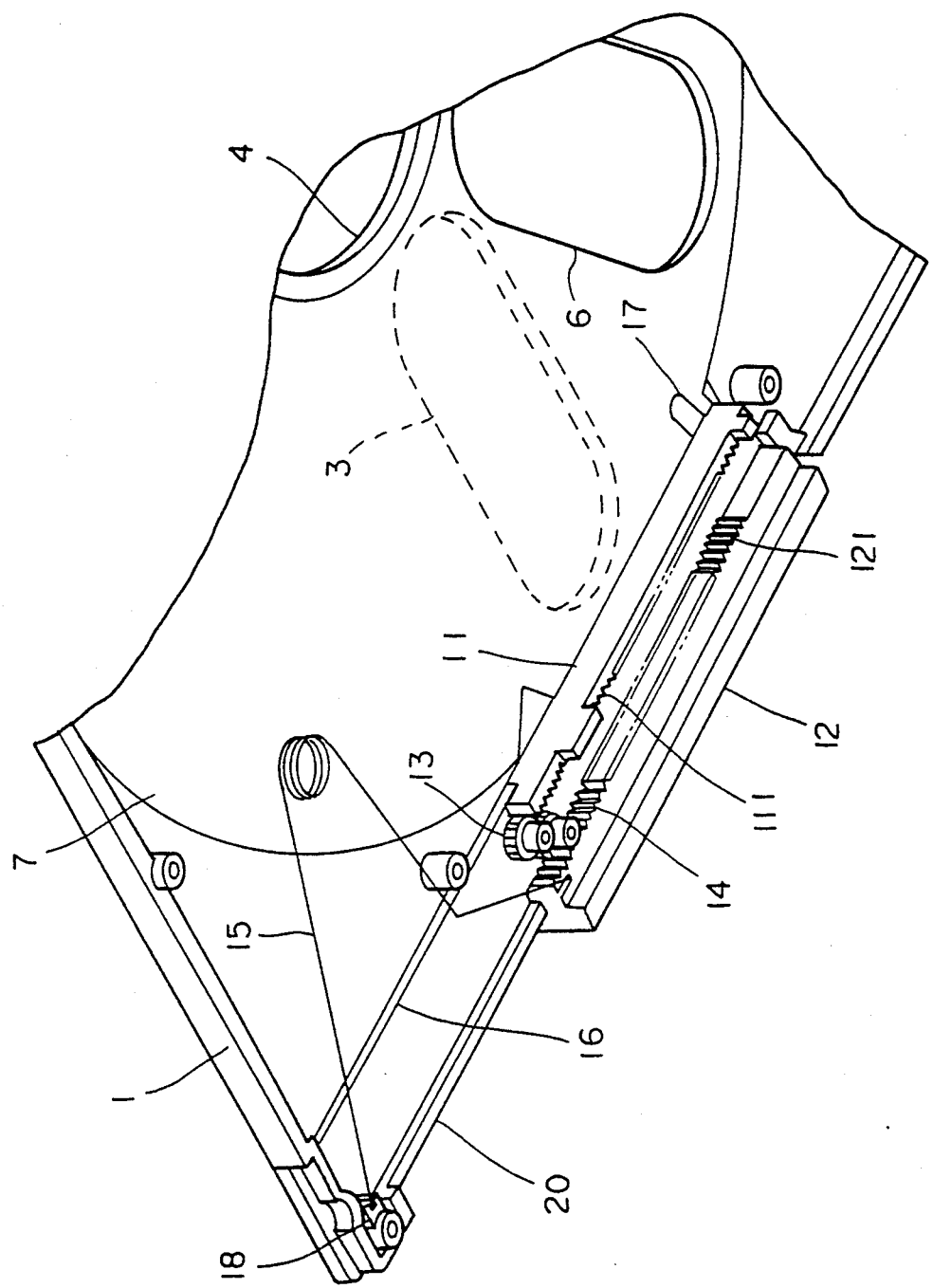

With the cartridge removed from the disk drive, the biasing spring 15 acts to force the slide members 11, 12 toward the closing direction and to rotate the shutter members 7 and 5 toward the closing direction. Then the openings 6 are offset from the access windows 3, that is, the access windows 3 are closed with the shutter member 7, and the pivotal shutter member 5 is biased clockwise to close the center aperture 4 as shown in FIGS. 1 and 4.

There is no risk that the recording surface of the disk experience rubs or damages. In a normal state when the disk is not used, the disk is safely accommodated in the casing with all the windows shut against any dust deposition or mechanical damage during storage and handling. The windows are opened only when the disk is in use.

There has been described a disk cartridge comprising a generally rectangular casing accommodating a disk for rotation and including a center aperture and a plurality of access windows, shutter means for opening and closing the center aperture and the access windows, a first slide member slidably disposed in the casing and cooperatively coupled to the shutter means, a second slide member slidably disposed along one side of the casing in parallel to the first slide member, the first and second slide members having racks on their opposed surfaces interlocked through a gear mechanism for transmitting the motion of the second slide member to said first slide member whereby the access windows and the center aperture are closed and opened by the shutter means with a minimal stroke of the slide members. The shutter means including shutter members and slide members for driving them can be reduced in size. A relatively large diameter shutter member can be operated with a less driving force for opening and closing a plurality of access windows. The disk is maintained safe or unchanged, and protected against any influence to the recording surface(s) for an extended period of time. The arrangement incorporated in the cartridge is simple and less expensive. The cartridge is easy to handle. A reduction in shutter opening and closing forces is advantageous in minimizing the wear of casing guides upon loading and unloading of the cartridge and in reducing loads on operating sections of the drive side, mitigating the limit on the design of disk and drive in both hardware and software aspects.

While there has been described herein what is considered to be a preferred embodiment of the present invention, other modifications of the invention shall be apparent to those skilled in the art from the teachings herein. It is, therefore, desired to be secured in the appended claims all such modifications as fall within the true spirit and scope of the invention.

We claim:

1. A disk cartridge adapted to be loaded in a disk drive having a drive shaft and a shutter actuating member, comprising:
    a generally rectangular casing accommodating a disk for rotation therein and including a center aperture for inserting the drive shaft and a plurality of access windows;
    shutter means for opening and closing the center aperture and the access windows;
    a first slide member slidably disposed in said casing and cooperatively coupled to said shutter means;
    a second slide member slidable disposed along only one outer side edge of said casing in parallel to said first slide member, said second slide member being adapted to be slid upon engagement with the shutter actuating member when the disk drive is loaded with the disk cartridge, said first and second slide members having racks on their opposing surfaces;
    a spring member biasing the second slide member to close the shutter means; and
    a gear mechanism in mesh with the racks on said first and second slide members for transmitting the motion of said second slide member, the transmitted motion of said first slide member is greater than the motion of said second slide member.

2. The disk cartridge of claim 1 wherein said shutter means includes
    a rotary shutter member mounted coaxially about said center aperture for rotation and having a plurality of openings at positions corresponding to said plurality of access windows,
    a pivotal shutter member mounted at a position spaced from said center aperture for pivotal motion for opening and closing said center aperture, and
    means for interlocking said rotary and pivotal shutter members.

3. A disk cartridge adapted to be loaded in a disk drive having a drive shaft and a shutter actuating member, comprising:
    a generally rectangular casing accommodating a disk for rotating therein and including a center aperture for inserting the drive shaft and a plurality of access windows;
    shutter means for opening and closing the center aperture and the access windows;
    a first slide member slidably disposed in said casing and cooperatively coupled to said shutter means;
    a second slide member slidably disposed along one side of said casing in parallel to said first slide member, said second slide member being adapted to be slid upon engagement with the shutter actuating member when the disk drive is loaded with the disk cartridge, said first and second slide members having racks on their opposed surfaces, and
    a gear mechanism in mesh with the racks on said first and second slide members for transmitting the motion of said second slide member to said first slide member, including a pair of gears having a gear ratio to multiply the movement of the first slide member relative to the second slide member.

4. The disk cartridge of claim 3 wherein said second slide member is disposed along one outer edge of said casing for sliding motion, the cartridge further comprising means for biasing the second slide member in a closing direction.

5. The disk cartridge of claim 4 wherein said biasing means is a spring.

6. A disk cartridge adapted to be loaded in a disk drive having a drive shaft and a shutter actuating member, comprising:

a generally rectangular casing accommodating a disk for rotation therein and including a center aperture for inserting the drive shaft and a plurality of access windows;

shutter means for opening and closing the center aperture and the access windows, including:

a rotary shutter member mounted coaxially about said center aperture for rotation and having a plurality of openings at positions corresponding to said plurality of access windows;

a pivotal shutter member mounted at a position spaced from said center aperture for pivotal motion for opening and closing said center aperture; and means for interlocking said rotary and pivotal shutter members;

a first slide member slidably disposed in said casing and cooperatively coupled to said shutter means;

a second slide member slidably disposed along one side of said casing in parallel to said first slide member, said second slide member being adapted to be slid upon engagement with the shutter actuating member when the disk drive is loaded with the disk cartridge, said first and second slide members having racks on their opposed surfaces, and a gear mechanism in mesh with the racks on said first and second slide members for transmitting the motion of said second slide member to said first slide member, including a pair of gears having a gear ratio to multiply the movement of the first slide member relative to the second slide member.

7. The disk cartridge of claim 6, wherein said second slide member is disposed along one outer edge of said casing for sliding motion, the cartridge further comprising means for biasing the second slide member in a closing direction.

8. The disk cartridge of claim 7, wherein said biasing means is a spring.

9. A disk cartridge adapted to be loaded in a disk drive having a drive shaft and a shutter actuating member, comprising:

a generally rectangular casing accommodating a disk for rotation therein and including a center aperture for inserting the drive shaft and a plurality of access windows;

shutter means for opening and closing the center aperture and the access windows, including a rotary shutter member mounted coaxially about said center aperture for rotation and having a plurality of openings at positions corresponding to said plurality of access windows;

a pivotal shutter member mounted at a position spaced from said center aperture for pivotal motion for opening and closing said center aperture, and means for interlocking said rotary and pivotal shutter members;

a first slide member slidably disposed in said casing and cooperatively coupled to said shutter means;

a second slide member slidably disposed along one side of said casing in parallel to said first slide member, said second slide member being adapted to be slide upon engagement with the shutter actuating member when the disk drive is loaded with the disk cartridge, said first and second slide members having racks on their opposed surfaces, and a gear mechanism in mesh with the racks on said first and second slide members for transmitting the motion of said second slide member to said first slide member.

10. A disk cartridge adapted to be loaded in a disk drive having a drive shaft and a shutter actuating member, comprising:

a generally rectangular casing accommodating a disk for rotating therein and including a center aperture for inserting the drive shaft and a plurality of access windows;

shutter means for opening and closing the center aperture and the access windows, including a first shutter for movement across the access windows and a second shutter for movement across the center aperture;

a first slide member slidably disposed in said casing and cooperatively coupled to said shutter means;

a second slide member slidably disposed along one side of said casing in parallel to said first slide member, said second slide member being adapted to be slid upon engagement with the shutter actuating member when the disk drive is loaded with the disk cartridge, said first and second slide members having racks on their opposed surfaces, and a gear mechanism in mesh with the racks on said first and second slide members for transmitting the motion of said second slide member to said first slide member to cause the movement of the first slide member to be larger than to the second slide member movement.

11. A disk cartridge as in claim 10 further including biasing means for moving the shutter means to a closed position.

12. A disk cartridge as in claim 10 wherein the shutter means further includes a pin mounted on the second shutter and a slot mounting the pin in the first shutter to enable a joint movement.

* * * * *